(12) United States Patent
Purushothaman et al.

(10) Patent No.: US 10,140,155 B2
(45) Date of Patent: *Nov. 27, 2018

(54) DYNAMICALLY PROVISIONING, MANAGING, AND EXECUTING TASKS

(71) Applicant: Pantheon, Inc., Reston, VA (US)

(72) Inventors: Rajesh Maramana Purushothaman, Fairfax, VA (US); Anin Kurishummoottil Mathen, South Riding, VA (US)

(73) Assignee: PANTHEON, INC., Reston, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/630,784

(22) Filed: Jun. 22, 2017

(65) Prior Publication Data

US 2017/0293504 A1 Oct. 12, 2017

Related U.S. Application Data

(63) Continuation of application No. 14/829,387, filed on Aug. 18, 2015, now Pat. No. 9,720,710.

(51) Int. Cl.
| | |
|---|---|
| G06F 9/46 | (2006.01) |
| G06F 9/50 | (2006.01) |
| G06F 9/445 | (2018.01) |
| G06F 8/71 | (2018.01) |
| G06F 17/30 | (2006.01) |

(52) U.S. Cl.
CPC .............. *G06F 9/5011* (2013.01); *G06F 8/71* (2013.01); *G06F 9/44521* (2013.01); *G06F 9/5083* (2013.01); *G06F 17/30283* (2013.01)

(58) Field of Classification Search
None
See application file for complete search history.

(56) References Cited

U.S. PATENT DOCUMENTS

| | | |
|---|---|---|
| 5,920,725 A | 7/1999 | Ma et al. |
| 6,845,503 B1 | 1/2005 | Carlson et al. |
| 7,360,208 B2 | 4/2008 | Joshi et al. |
| 8,031,634 B1 | 10/2011 | Artzi et al. |
| 8,095,823 B2 | 1/2012 | Griffith et al. |
| 8,417,737 B2 | 4/2013 | Hopmann et al. |
| 8,521,853 B2 | 8/2013 | Rathunde et al. |
| 8,799,431 B2 | 8/2014 | Pabari |

(Continued)

OTHER PUBLICATIONS

V. S. Tondre et al., "Trends and Prospectives of the Dynamic Resource Management Using Adaptive Techniques in Distributed System", International Journal of Computer Science and Telecommunications, vol. 2, Issue 7, Oct. 2011, pp. 68-77.

(Continued)

*Primary Examiner* — Gregory A Kessler
(74) *Attorney, Agent, or Firm* — MH2 Technology Law Group, LLP

(57) ABSTRACT

Embodiments relate to systems, devices, and computer-implemented methods for provisioning, managing, and executing tasks. An agent program can be configured to receive task data, determine a task definition corresponding to the task data, retrieve the task definition, and execute the task definition using the task data. The agent program can additionally be configured to set a time-to-live for the task definition and locally delete the task definition when the time-to-live elapses.

20 Claims, 7 Drawing Sheets

(56) References Cited

U.S. PATENT DOCUMENTS

| | | |
|---|---|---|
| 2003/0041036 A1 | 2/2003 | Molinari et al. |
| 2006/0080656 A1 | 4/2006 | Cain et al. |
| 2007/0245331 A1 | 10/2007 | Daynes et al. |
| 2010/0162226 A1 | 6/2010 | Borissov et al. |
| 2012/0271908 A1 | 10/2012 | Luna et al. |
| 2013/0227558 A1 | 8/2013 | Du et al. |
| 2013/0339950 A1 | 12/2013 | Ramarathinam et al. |
| 2014/0101652 A1 | 4/2014 | Kamble et al. |
| 2015/0172303 A1* | 6/2015 | Humble .............. H04L 63/1408 726/23 |

OTHER PUBLICATIONS

Paul Anderson et al., "Multi-Agent Negotiation of Virtual Machine Migration Using the Lightweight Coordination Calculus", http://homepages.inf.ed.ac.uk/dcspaul/homepage/live/pdf/ams12-008.pdf, retrieved on Sep. 17, 2014, pp. 1-10.

International Search Report and Written Opinion of the International Searching Authority dated Oct. 24, 2016, International Application No. PCT/US2016/047006, pp. 1-8.

\* cited by examiner

DYNAMICALLY PROVISIONING, MANAGING, AND EXECUTING TASKS

This application is a continuation application of U.S. application Ser. No. 14/829,387 filed Aug. 18, 2015, the entire disclosure of which is hereby incorporated by reference in its entirety.

BACKGROUND

Mission critical environments are environments that include one or more systems whose failure may result in the failure of a goal-directed activity. Failures can include, for example, equipment, process, procedure, and/or software failures.

An example of a mission critical environment is a life-critical environment, where a failure can result in loss of life, serious injury, loss or severe damage to property, and/or environmental harm (e.g. robotic surgery systems and nuclear reactor systems). An additional example of a mission critical environment is a business-critical environment, where a failure can result in failure of business operations for one or more businesses.

Due to their essential nature, mission critical environments can require periods of no system or service downtime, and some may require extended or perpetual periods of uninterrupted operation. Accordingly, some mission critical environments may require updates and maintenance while still in operation and without interrupting the provided services.

Additional considerations for mission critical environments can include, for example, preventing single points of failure, avoiding conflicts between processes, managing memory usage, managing central processing unit (CPU) usage, and allowing execution of complex processes.

Accordingly, there is a desire for methods, systems, and computer readable media that address these and other considerations in mission critical environments.

SUMMARY

The present disclosure relates to systems, devices, computer-readable storage media, and methods for managing tasks in environments such as, for example, mission critical environments. Tasks can be managed using an agent program.

An agent program can be configured to receive task data, determine a task definition corresponding to the task data, retrieve the task definition, and execute the task definition using the task data. The agent program can additionally be configured to set a time-to-live for the task definition and to locally delete the task definition when the time-to-live elapses.

In some embodiments, the agent program can be run on a virtual machine, such as a Java Virtual Machine.

In further embodiments, the agent program can authenticate the source of the task data and/or the task definition.

In some implementations, the agent program can further retrieve classes and libraries corresponding to the task definition.

In further implementations, the agent program can store the task definition in hard disk memory after receiving the task definition and before executing the task definition.

In some embodiments, the agent program can instantiate a classloader, and the instance of the classloader can retrieve the task definition from hard disk memory and load the task definition into cache or volatile memory.

In further embodiments, the instance of the classloader can be isolated from other instances of the classloader corresponding to other task definitions, and, using the instance of the classloader, the task definition can be executed concurrently with one or more of the other task definitions.

In some implementations, the task definition can comprise a plurality of task definitions, where a first task definition depends on a second task definition and executing the task definition includes executing both the first task definition and the second task definition.

In other embodiments, the time-to-live of the task definition can be set based on a counter corresponding to a number of times that the task definition is executed or a period of time elapsing since it was last loaded. Further, the task definition can be executed multiple times using multiple sets of task data prior to the time-to-live elapsing and the task definition being deleted.

BRIEF DESCRIPTION OF THE DRAWINGS

The accompanying drawings, which are incorporated in and constitute a part of this specification, illustrate various embodiments of the present disclosure and together, with the description, serve to explain the principles of the present disclosure. In the drawings.

DETAILED DESCRIPTION

Figure 1:
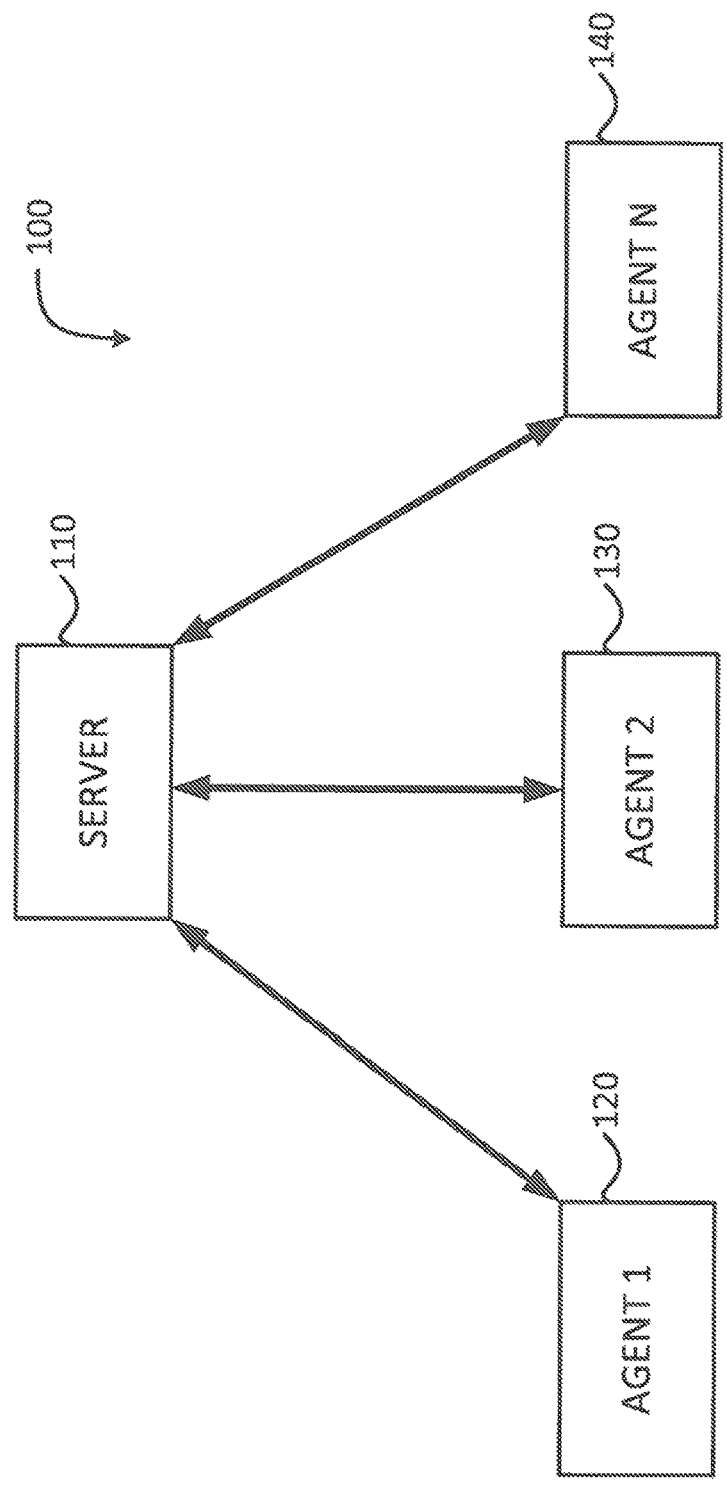
FIG. 1 is a diagram depicting a schematic of a distributed agent environment, consistent with certain disclosed embodiments.

The following detailed description refers to the accompanying drawings. Wherever convenient, the same reference numbers are used in the drawings and the following description refers to the same or similar parts. While several examples of embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

FIG. 1 is a diagram depicting a schematic of a distributed agent environment, consistent with certain disclosed embodiments. In particular, FIG. 1 depicts a distributed agent environment 100, including a server 110, a first agent 120, a second agent 130, and one or more additional agents 140. Server 110 can be in communication with first agent 120, second agent 130, and one or more additional agents 140. For example, server 110 can be in communication with agents 120-140 via a direct connection and/or a network connection (e.g., a local area network or a wide area network such as the Internet).

In some embodiments, server 110 can represent one or more computing devices in one or more locations that host and maintain tasks, task locations, task definitions, classes, and/or libraries. For example, server 110 can represent a distributed network of servers that host and maintain the tasks, task locations, task definitions, classes, and/or libraries. Each server in the distributed network of servers can maintain all or part of the stored information. In some embodiments, servers at different locations can include overlapping stored information to ensure that the agents are not dependent on a single server and can receive necessary updates and information from the servers even if one or more servers experience downtime or otherwise become unavailable.

In some implementations, server 110 can be, for example, a personal computer, a mainframe computer, or any other device with a network connection capable of maintaining tasks and task definitions and communicating with other devices. In further implementations, server 110 can be a specialized device specifically designed to perform the functions described herein.

As used herein, a "task" refers to a distinct computable block (e.g. an algorithm) that performs one or more processes. In some embodiments, the one or more processes are performed automatically. A task can include a "task definition," which refers to computer-readable instructions (e.g. code) for performing the one or more processes.

In some embodiments, a task can be associated with one or more versions, and each version number can represent a different task definition. Accordingly, when a task is "updated," a new version of the task is created with a new task definition.

In some implementations, server 110 can host and maintain the tasks and task definitions using one or more databases (not pictured). In some embodiments, the one or more databases can be located on server 110, while, in further embodiments, the one or more databases can be located on separate devices in communication with server 110. Databases on separate devices can be connected via a direct connection to server 110 and/or can be connected via a network connection (e.g., a local area network or a wide area network such as the Internet).

In further implementations, server 110 can additionally host and maintain classes and libraries that are used by tasks. As used herein, a "class" refers to a data structure including procedures, variables, and/or functions. In some embodiments, classes can be dependent on a library. As also used herein, a "library" is a collection of resources (e.g. data structures, utility classes, container classes, functions, interfaces, engines, message templates, values, type specifications, etc.) that can be used by classes. In some implementations, libraries and classes can be stored on server 110 and/or stored on the one or more databases described above.

As used herein, an "agent" (e.g. agents 120, 130, and 140) can refer to a software program that can be used for containing and executing one or more tasks or, alternatively, can refer to one or more client devices that are running an agent program. In some embodiments, the agents can execute the one or more tasks on demand, as part of a pre-defined schedule, upon detection of an event, etc.

In some implementations, an agent can run on one or more computing devices in communication with server 110, while, in further implementations, multiple agents can run on the same computing device in communication with server 110. For example, a client device can run virtual machine (VM) software that creates a VM that runs the agent program. As an additional example, a client device can run VM software that creates multiple VMs that run multiple agent programs.

Using a VM allows for fine-grained control over instructions performed by the agent program. This can allow safe execution of tasks within the VM. For example, the VM can create a restricted sandbox for running the agent program, which can limit actions performed by the agent program and/or allow strict control over the files and/or variables that the agent program interacts with. In some embodiments, the virtual machine can be a Java virtual machine (JVM). A JVM not only provides the protection of a VM, but also creates a framework for interoperability between tasks that may have been separately coded (i.e. without the tasks being specifically designed for interoperability). The JVM is also associated with a specification to aid in coding interoperable instruction sets. In some embodiments, a JVM can also include one or more libraries for use by tasks that are executed by the agent program running within the JVM.

As an example of the embodiment depicted in FIG. 1, agent 120 and agent 130 can be two separate computing devices at two separate locations running agent programs, and agent 140 can be a single computing device running multiple agent programs.

Agents 120, 130, and 140 can communicate with server 110 to retrieve tasks, retrieve classes, retrieve libraries, retrieve task locations, and/or retrieve indications of current task versions, as described in further detail below The example depicted in FIG. 1 is merely for the purpose of illustration, and is not intended to be limiting. For example, additional servers and additional or fewer agents may be used as part of a distributed agent environment. Further, the distributed agent environment depicted and processes described are merely a simplified example of a distributed agent environment, consistent with certain disclosed embodiments, but such an example is not intended to be limiting.

Figure 2:
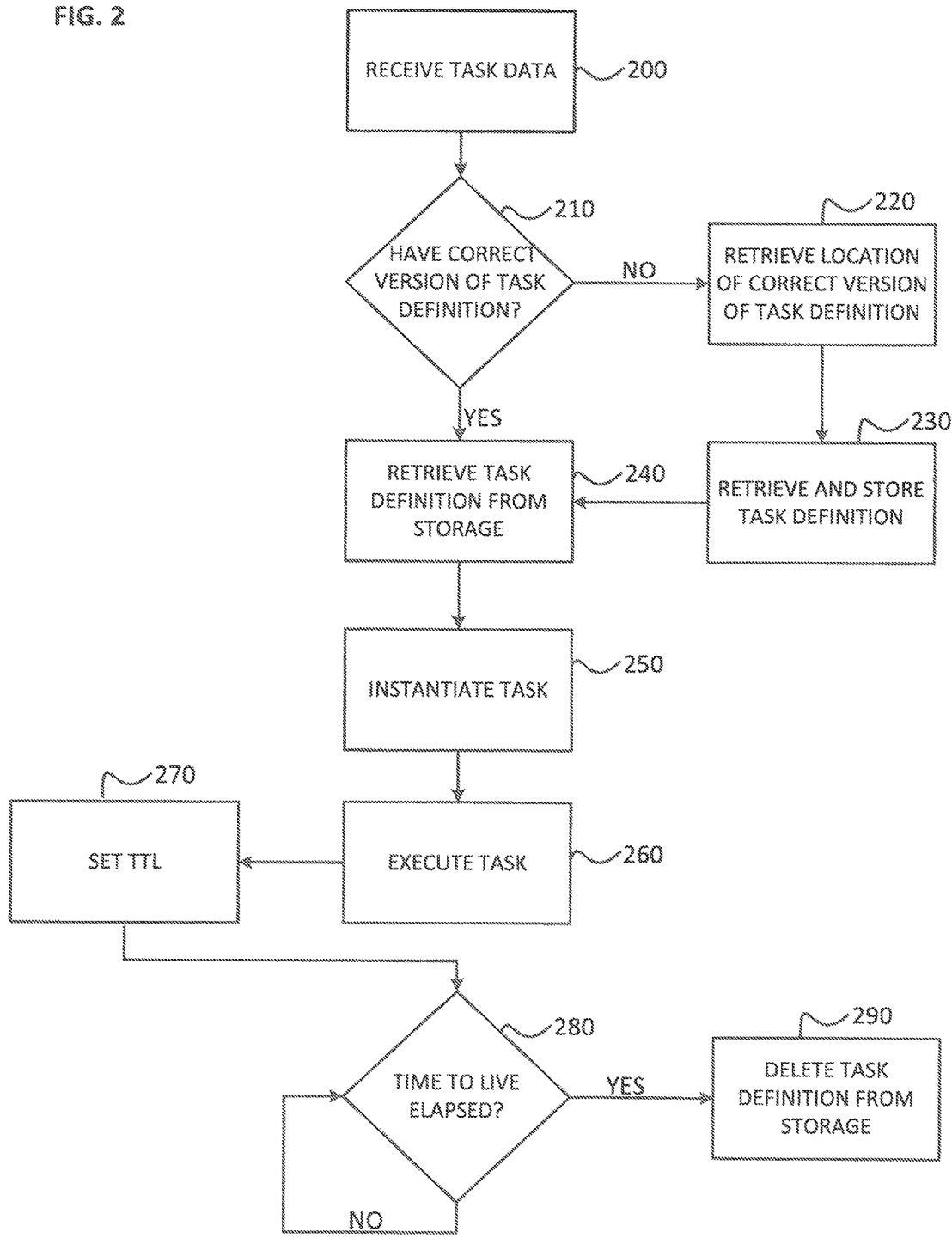
FIG. 2 is a flow diagram illustrating an example of a method of retrieving, executing, and maintaining tasks, consistent with certain disclosed embodiments.

FIG. 2 is a flow diagram illustrating an example of a method of retrieving, executing, and maintaining tasks, consistent with certain disclosed embodiments. The method can be performed on a computing device, such as, for example, a client device running an agent program on a VM. In some implementations, a client device can be, for example, a personal computer, a mobile device, a tablet computer, a specialized device that is part of a mission critical environment, or any other device with a network connection capable of receiving data, running an agent program, and running tasks.

The example of a method shown can begin in 200, when the client device receives task data. In some implementations, the task data can be received from a source, such as, for example, a task currently being or previously performed by the agent, an input from a user, an input from a sensor, a task currently being or previously performed by an agent on a different device and/or VM, or from a Server such as server 110 etc. In some embodiments, the source can be an authenticated source. For example, the client device can confirm one or more credentials of the source (e.g. a certificate, password information, an authorized internet protocol (IP) address, use of an authorized port, etc.) before proceeding with the task data. In some embodiments, the task data can include, for example, instructions to perform a task, data to perform the task on or with, and/or an indicator of a compatible task version.

In 210, the client device can determine if it has the correct version of the task definition for the task corresponding to the task data received in 200. In some embodiments, the client device can search its storage for the task (e.g. by task name) and determine if the version of the locally stored task matches an indicator of the compatible task version in the task data. In further embodiments, the client device can contact a task management server (e.g. server 110 in FIG. 1) to determine if the version of the locally stored task matches the current version (i.e. the latest version) of the task.

If, in 210, the client device does not have the task corresponding to the task data locally stored or the client device does not have the correct version of the task locally stored, the method can proceed to 220. Otherwise, if the client device does have the correct version of the task, the method can proceed to 240

In 220, the client device can transfer a request for a location of the correct version of the task (i.e. the correct task definition) to a task management server (e.g. server 110 in FIG. 1). In some implementations, the request can include an identifier of the task (e.g. a name) and a version number of the task. In other implementations, the request can be for the latest version and can simply include the identifier of the task.

In some embodiments, the task management server can maintain a list of storage locations of non-obsolete versions of every task that is managed by the server. In some implementations, non-obsolete versions of tasks can be the latest version of every task. In other implementations, non-obsolete versions of tasks can be every version of a task that is either the latest version or is a version that is depended on by another task (task dependency is explained in further detail below). In further implementations, non-obsolete versions of tasks can be the latest versions and every other version that is still used by at least one agent. In still further implementations, the task management server can maintain a list of storage locations of all versions of every task.

In various embodiments, storage locations can include, but are not limited to, local storage on the task management server that received the request or a database associated with the task management server, other task management servers or their associated databases in a distributed network of servers, or a central database not associated with a specific task management server.

Based on the request from the client device, the task management server can determine the storage location of the requested version by searching the list of storage locations using the name of the task. In some embodiments, the task management server can then return the location of the requested version to the client device. For example, the task management server can return an indication of the storage location (e.g., IP addresses, domain names, port numbers, etc.).

In 230, the client device can retrieve the correct version of the task by requesting the correct version of the task using the indication of the storage location. For example, the client device can connect to the storage location using an IP address and/or a domain name and retrieve the correct version of the task using the Hypertext Transfer Protocol (HTTP), the File Transfer Protocol (FTP), etc. The client device can then store the correct version of the task and proceed to 240. In some embodiments, the client device can confirm that the storage location is an authenticated source for the task. For example, the client device can confirm one or more credentials of the storage location of the correct version of the task (e.g. a certificate, password information, an authorized IP address, use of an authorized port, etc.) before proceeding.

In some embodiments, retrieving the task can include retrieving any classes and/or libraries that the task depends on. The classes or libraries can be retrieved from the same storage location or can be retrieved from other storage locations. In further embodiments, the classes or libraries may not be retrieved with the tasks but, instead, the classes or libraries can be retrieved, functionality of the classes or libraries can be accessed, and/or objects of the classes or libraries can be used upon execution of the task (260 below). In other words, the classes and libraries and their respective objects and functions can be retrieved at runtime of the task.

In some embodiments, the client device can confirm that the storage location(s) of the classes and/or libraries are authenticated sources for the classes and/or libraries. For example, the client device can confirm one or more credentials of the storage location(s) of the classes and/or libraries (e.g. certificates, password information, authorized IP addresses, use of authorized ports, etc.) before proceeding In 240, the client device can retrieve the task definition from storage (i.e. load the task definition). For example, the agent program can include and manage a classloader subroutine that retrieves task definitions from mass storage (e.g. hard disk memory) and loads the task definitions into cache and/or volatile memory (e.g., random-access memory (RAM)). In some embodiments, the classloader can also verify that the task definition was loaded correctly (e.g., using a checksum). In further embodiments, the classloader may also register the task with the agent program by adding the task to a list of "registered tasks." For example, the agent program can maintain the list of registered tasks, and the registered tasks can represent tasks that are currently available to the agent program. Additionally, in some implementations, the classloader can shield each task by preventing interference between tasks. Classloaders can shield tasks by allowing visibility of dependent classes and libraries to be restricted to only the classes and libraries loaded inside the specific classloader. All other sibling classloaders and their loaded classes can be invisible to the classes and libraries. Classes and libraries loaded by a parent or a grandparent classloader are visible to the child, or grandchild classloader.

In 250, the client device can instantiate the task. For example, the agent program can include a task instantiator subroutine that instantiates individual tasks. The task instantiator can initiate the task and plug the task into a service interface of the agent. For example, the task instantiator can map inputs and outputs of the task into the service interface. The service interface can interface each of the tasks with the agent program by transmitting inputs and outputs between tasks, the agent program, and/or input and output devices of the client device.

In 260, the client device can execute the task. In other words, the individual instructions in the task definition can be executed via the agent program. In some embodiments, the instructions can require inputs from other tasks, service interface variables, input files, etc. Service interface variables can represent variables stored on or retrievable by the client device and managed by the service interface, and the service interface variables can be set or read by other tasks executed by the agent program, other programs executed by the client device, input devices or output devices of the client device, etc. In some embodiments, access to the service interface variables can be restricted and/or controlled by a VM that the agent program is running on. For example, the VM may maintain the service interface variables, which may not be accessible outside the framework of the VM, and may only allow task executed by the agent program to access the service interface variables of the VM.

The inputs or input files can be retrieved, via the service interface, by the task to perform the instructions of the task definition. In further embodiments, the instructions can result in changes to the service interface variables, changes to the input files, newly created files, instructions to modify or delete files, outputs to other tasks executed by the agent program, outputs to other programs executed by the client device, outputs to output devices of the client device, etc. The output or output instructions can be transferred, via the service interface, by the task in response to the instructions.

In 270, in some embodiments and in response to the execution of the task, a counter can be incremented. The counter can be associated with the specific task and/or task definition and can be used and maintained by a task recycler to determine a time-to-live (TTL) of the task. In some implementations, the task recycler can determine the TTL of the task by setting the TTL to a higher value (e.g., one week) if the counter has a high value (e.g., ten uses of the task) and a lower value (e.g., one hour) if the counter has a low value (e.g., one use of the task). For example, the task recycler can use a least recently used (LRU) cache algorithm. In further implementations, the counter can also be reset at predefined intervals by the task recycler (e.g. every week). In some embodiments, the task recycler can be a subroutine of the agent program.

In 280, the task recycler can determine if the TTL has elapsed. If, in 280, the TTL has not elapsed, the task recycler can wait a predetermined amount of time before re-determining, in 280, whether the TTL has elapsed. Alternatively, the task recycler can re-determine if the TTL has elapsed based on a specified event (e.g. amount of memory used to store task definitions exceeds a threshold level, a threshold amount of tasks are executed by the agent program, etc.). If, in 280, the TTL has elapsed, the task recycler can delete the task definition from storage.

Accordingly, the task recycler can optimize the memory footprint of the agent program so that only the most used tasks are locally stored on the client device. This allows for minimal latency in retrieving task definitions for tasks that are frequently performed, and minimal use of storage space by deleting locally stored tasks that are rarely performed.

While the operations depicted in FIG. 2 have been described as performed in a particular order, the order described is merely exemplary, and various different sequences of operations can be performed, consistent with certain disclosed embodiments. Additionally, the operations are described as discrete steps merely for the purpose of explanation, and, in some embodiments, multiple operations may be performed simultaneously and/or as part of a single computation. Further, the operations described are not intended to be exhaustive or absolute, and various operations can be inserted or removed.

Figure 3:
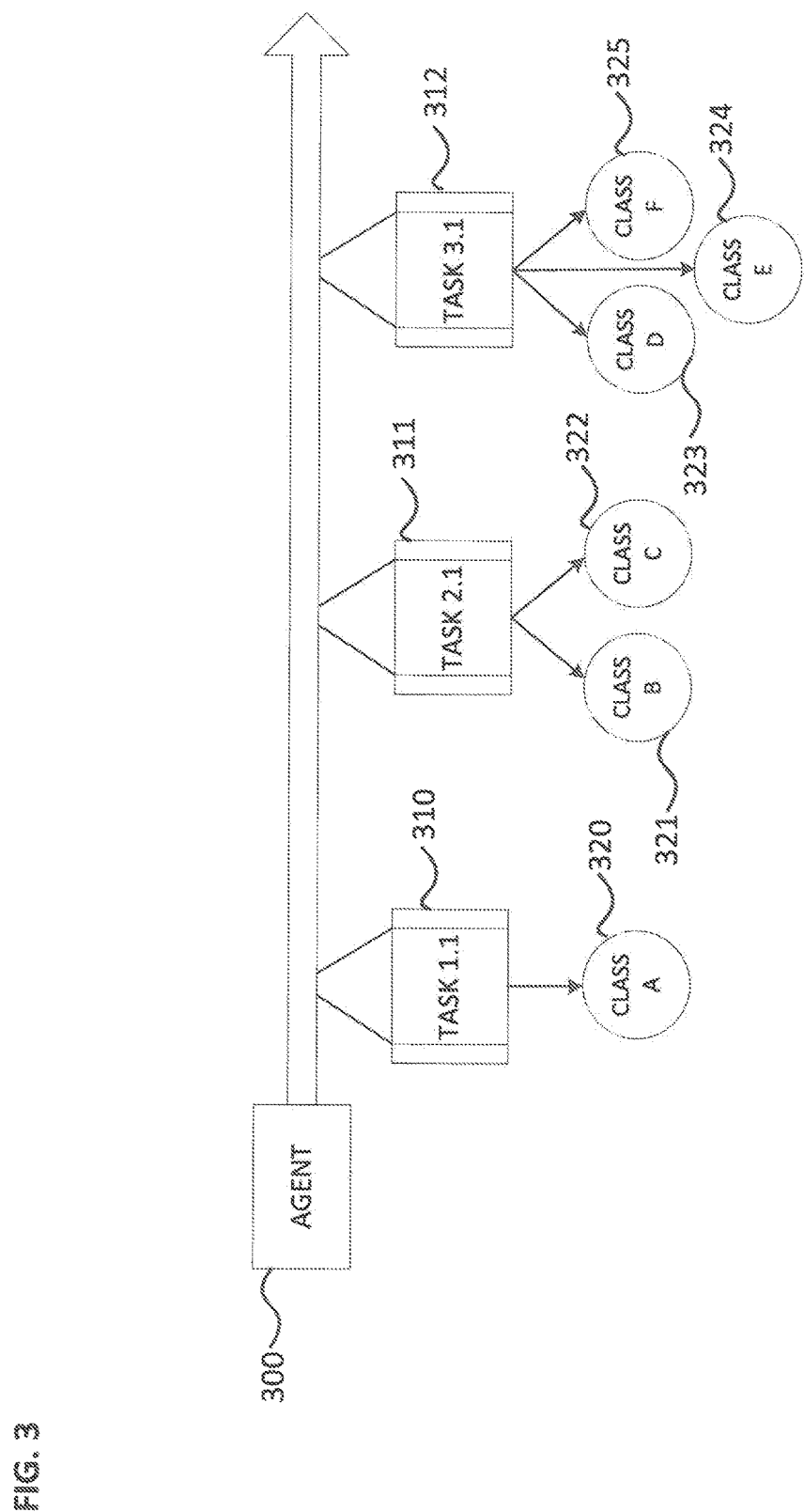
FIG. 3 is a schematic depicting the execution of an agent program running tasks that depend on one or more classes, consistent with certain disclosed embodiments.

FIG. 3 is a schematic depicting the execution of an agent program running tasks that depend on one or more classes, consistent with certain disclosed embodiments. In some embodiments, the agent program 300 can run within a JVM.

As shown in FIG. 3, agent program 300 can run task 1.1 (310), task 2.1 (311), and task 3.1 (312). In the examples shown herein, tasks use the naming convention (name). (version). Accordingly, for example, task 1.1 (310) represents a first version of a task named "1." The naming convention is merely an example for ease of illustration, is not intended to be limiting, and other naming conventions can be used, consistent with certain disclosed embodiments.

In some embodiments, agent program 300 can run tasks 310-312 automatically and in order based on, for example, a preprogrammed schedule (e.g. every hour), the occurrence of an event, etc. In other embodiments, agent program 300 can run tasks 310-312 individually based on, for example, a preprogrammed schedule, the occurrence of an event associated with a specific task (e.g. a request for an output of a specific task), a user instruction, etc.

As shown in FIG. 3, tasks 310-312 depend on one or more classes. Task 1.1 (310) depends on class A (320). In some embodiments, task 1.1 (310) may simply execute one or more functions provided by class A (320), while, in further embodiments, task 1.1 (310) may include additional instructions that adapt input, output, functions, and/or data structures within class A (320). Task 2.1 (311) depends on class B (321) and class C (322). In some embodiments, task 2.1 (311) may simply execute functions provided by class B (321) and class C (322), while, in further embodiments, task 2.1 (311) may include additional instructions that adapt input, output, and/or functions within class B (321) and/or class C (322). Task 3.1 (312) depends on class D (323), class E (324), and class F (325). In some embodiments, task 3.1 (312) may simply execute functions provided by class D (323), class E (324), and class F (325), while, in further embodiments, task 3.1 (312) may include additional instructions that adapt input, output, and/or functions within class D (323), class E (324), and/or class F (325).

An example use of an agent program is presented below in the context of a file replication agent. The example use is merely for illustration and is not intended to be limiting.

In the example, agent program 300 can be adapted to be a file replication agent that replicates content between two file systems. The file replication agent can automatically execute tasks 310-312.

Task 1.1 (310) can be a task that checks a list of new content on a first system within the last hour. Task 1.1 (310) uses class A (320). Class A (320) can include a function that requires an input of a location in storage of a file and outputs any additions to the file since the last time the file was checked. The file can be a text file that maintains a list of the location of every new file added to a first system. The output can be locations of new files that were added on the first system. Class A (320) may also set a service interface variable based on whether new files were added on the first file system. The service interface variable can be a Boolean value that is set by the functions of Class A (320) to be a first value if there are no new files and a second value if there are new files.

Task 2.1 (311) can be a task that determines whether a network connection needs to be established with a second system and then, if necessary, establishes a network connection between the first system and the second system. Task 2.1 (311) uses class B (321) and class C (322). Class B (321) can include a function that monitors the Boolean value maintained by Class A (320) and initiates the functions of Class C (322) based on a value that indicates that there are new files. Class C (322) can include a function that sets up a Transmission Control Protocol (TCP) connection or other relevant protocol based connection between the first system and the second system.

Task 3.1 (312) can be a task that ensures that the new files have not been previously stored on the second system, transfers the new files, and requests a confirmation from the second system that the new files were received. Task 3.1 (312) may not execute if there are no new files on the first system. Task 3.1 (312) uses class D (323), class E (324), and class F (325). Class D (323) can include a function that transfers a request to the second system via the network (e.g., TCP) connection to ensure that the new files have not already been transferred. Class D (323) can require an input of the names of the new files and output a Boolean value that indicates whether the files were previously transferred. Class E (324) can have inputs of the Boolean value that indicates whether the files were previously transferred and the locations of the new files. Class E (324) can then transfer the new files (if not previously transferred) via the network (e.g., TCP) connection. Class F (325) can include a function that transfers a request to the second system via the TCP connection to confirm that the new files have been received. Class F (325) can have an output of a Boolean value that indicates whether the new files were received by the second system.

Figure 4:
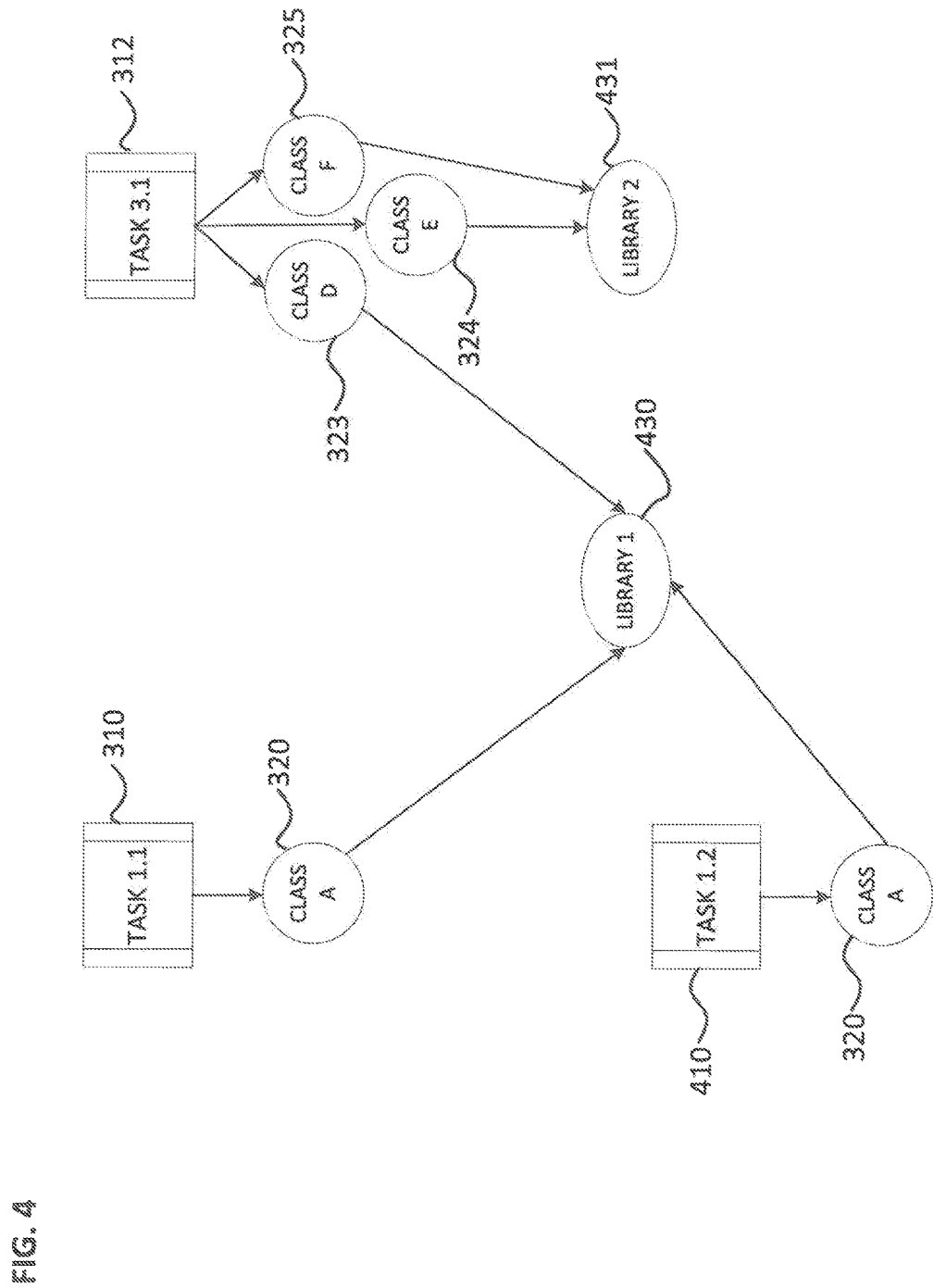
FIG. 4 is a schematic depicting tasks that use on one or more classes that depend on at least one library, consistent with certain disclosed embodiments.

FIG. 4 is a schematic depicting tasks that use on one or more classes that depend on at least one library, consistent with certain disclosed embodiments.

As shown in FIG. 4, two different versions of task 1 can exist: task 1.1 (310), representing the first version, and task 1.2 (410) representing the second version. For example, task 1.2 (410) can represent an updated version of task 1.1 (310).

In some embodiments, task 1.1 (310) and task 1.2 (410) can both use class A (320). However, task 1.1 (310) and task 1.2 (410) can include, for example, different instructions that adapt input received by the task, output from the task, and/or functions of class A (320). As an example, task 1.1 (310) can be a task that checks a list of new content on a first system within the last hour and task 1.2 (410) can be an updated version of task 1.1 (310). Class A (320) can include a function that requires an input of a location in memory of a file and outputs any additions to the file since the last time the file was checked. Task 1.2 (410) may convert the output of class A (320) into a specific file format, while task 1.1 (310) may not perform such a conversion.

Task 3.1 can use class D (323), class E (324), and class F (325).

Class A (320) and class D (323) can depend on library 1 (430) and class E (324) and class F (325) can depend on library 2 (431). Libraries 1-2 can provide data structures, utility classes, functions, interfaces, engines, etc. that can be used by the associated class. For example, class E (324) and class F (325) can include functionality that requires communication via a TCP connection, and library 2 (431) can include functions and data structures that can be used to set up a TCP connection.

Figure 5:
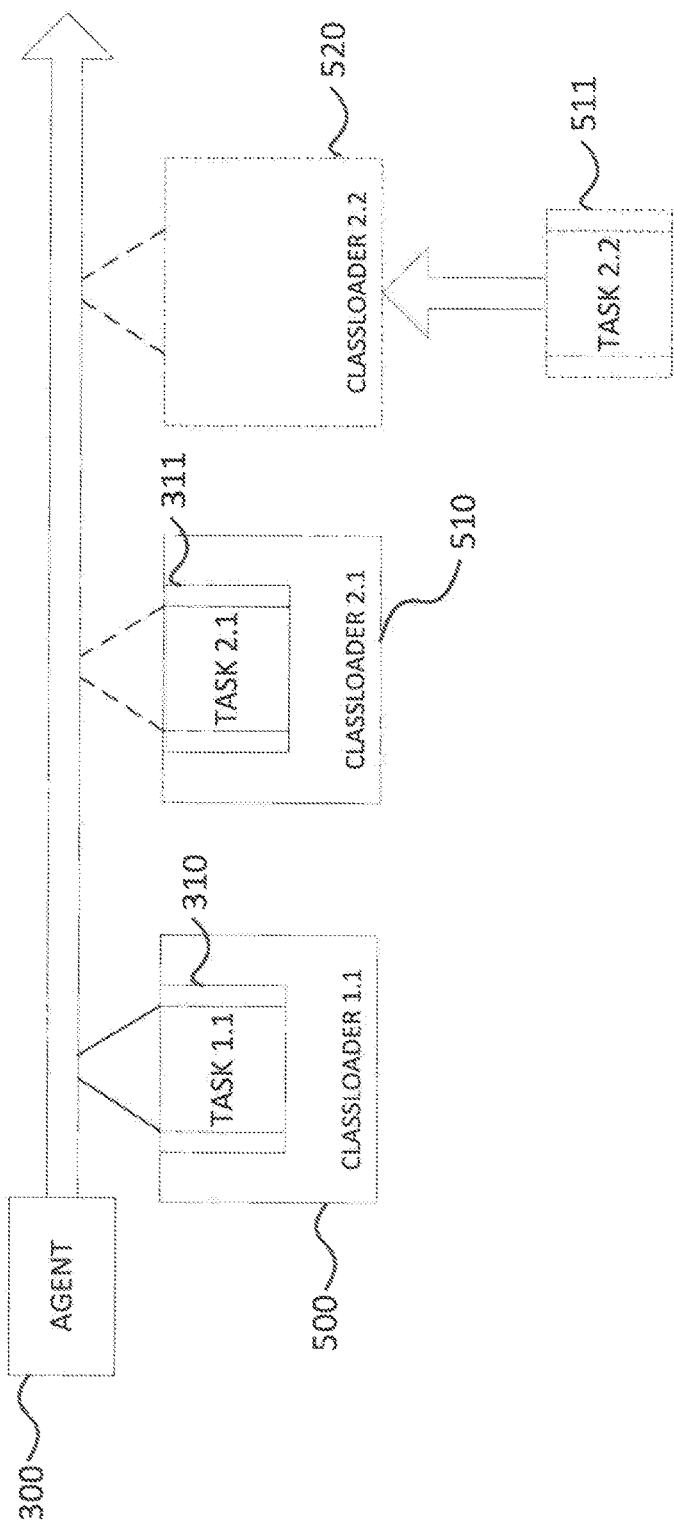
FIG. 5 is a schematic depicting the execution of an agent program running tasks using classloaders, consistent with certain disclosed embodiments.

FIG. 5 is a schematic depicting the execution of an agent program running tasks using classloaders, consistent with certain disclosed embodiments. In some embodiments, the agent program 300 can run within a JVM.

As shown in FIG. 5, agent program 300 can run task 1.1 (310) and task 2.1 (311). Each task can be run using an instance of a classloader. In some embodiments, classloader 1.1 (500) can be a first instance of a classloader instantiated by agent program 300 for task 1.1 (310) and classloader 2.1 (510) can be a second instance of the classloader instantiated by agent program 300 for task 2.1 (311). In some embodiments, classloader 1.1 (500) and classloader 2.1 (510) can be subroutines that retrieve and load tasks and register the tasks with agent program 300. Additionally, a classloader can maintain the independence of tasks from agent program 300 and other tasks, can ensure there are no name or memory violations, and can ensure there are no version conflicts or cross-contamination of libraries. Classloaders can shield classes and libraries loaded within themselves from other classloaders that are siblings. Classes and libraries loaded by parent or grandparent classloaders are visible and usable by the appropriate classloader classes. Further, because the classloader maintains the independence of tasks, in some embodiments, tasks can be executed concurrently by agent program 300. The classes and libraries in different versions of the same task can be run concurrently in sibling classloaders because the namespace of libraries and classes loaded in each are shielded from each other.

In some embodiments, agent program 300 can retrieve task 2.2 (511) (e.g., in step 230 of FIG. 2), which is a newer version of task 2.1 (311). Based on retrieving task 2.2 (511), agent program 300 can instantiate classloader 2.2 (520), a new instance of the classloader. Classloader 2.2 (520) can load task 2.2 (511) and all the classes and/or libraries used by task 2.2 (511).

Because task 2.2 (511) is an updated version of task 2.1 (311), agent program 300 can disconnect and/or delete classloader 2.1 (510) and replace it with classloader 2.2 (520). Agent program 300 can subsequently execute task 2.2 (511) instead of task 2.1 (311) and because the classloaders and tasks are independent of agent program 300, agent program 300 can continue to run the tasks (e.g. automatically) without interruption while concurrently updating the task and/or without restarting agent program 300 or the JVM. Accordingly, a mission critical system that uses agent program 300 and/or the tasks would not need to experience downtime to update the tasks.

In some embodiments, task 2.1 (311) can still be executing while and/or after task 2.2 (511) is retrieved by classloader 2.2 (520). However, because each instance of the classloader maintains the independence of its respective task, task 2.1 (311) can continue to execute after task 2.2 (511) is loaded, and task 2.1 (311) and task 2.2 (511) can be executed concurrently by agent program 300. Accordingly, the execution of task 2.1 (311) is not interrupted during its execution and it can subsequently be removed after its execution is complete.

Figure 6:
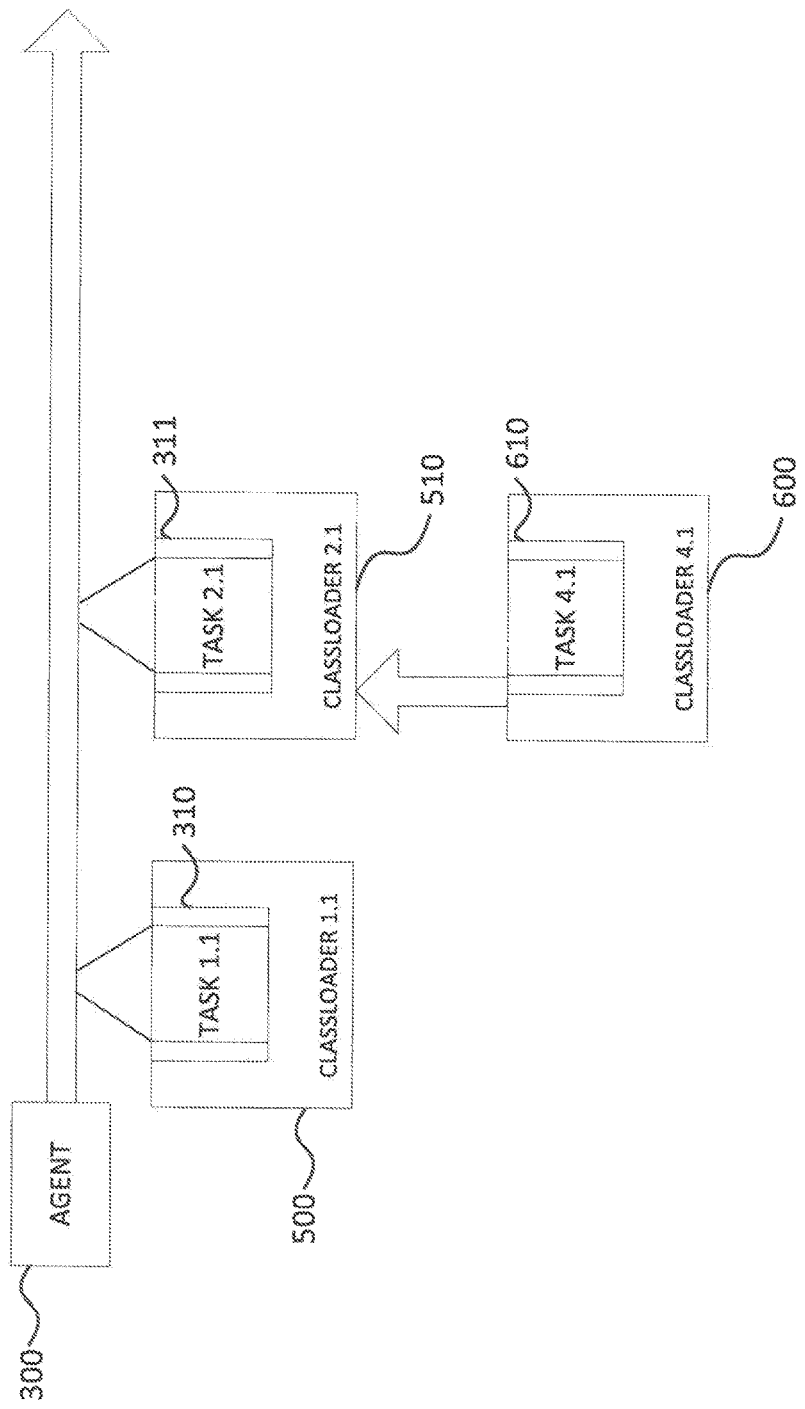
FIG. 6 is a schematic depicting the execution of an agent program running a task that depends on a second task, consistent with certain disclosed embodiments.

FIG. 6 is a schematic depicting the execution of an agent program running a task that depends on a second task, consistent with certain disclosed embodiments. In some embodiments, the agent program 300 can run within a JVM.

As shown in FIG. 6, agent program 300 can run task 1.1 (310) and task 2.1 (311). Each task can be retrieved and loaded using an independent instance of a classloader. In some embodiments, classloader 1.1 (500) can be generated by agent program 300 for task 1.1 (310) and classloader 2.1 (510) can be generated by agent program 300 for task 2.1 (311).

Additionally, task 2.1 (311) depends on task 4.1 (610). For example, task 2.1 (311) can use task 4.1 (610) as a subroutine of the process performed by task 2.1 (311). Task 4.1 (610) can be retrieved and loaded using an independent instance of a classloader. Classloader 4.1 (600) can be instantiated by agent program 300 for task 4.1 (610). In some embodiments, classloader 4.1 (600) can be interfaced with classloader 2.1 (510), which allows task 2.1 (311) to utilize classes and libraries in task 4.1 (610).

In some embodiments, because task 2.1 (311) and task 4.1 (610) are loaded by isolated classloaders, task 2.1 (311) or task 4.1 (610) can be updated with new versions without affecting the other. Therefore, agent program 300 can continue to run the tasks (e.g. automatically) without interruption due updating the task and/or without restarting agent program 300 or the JVM. Accordingly, a mission critical system that uses agent program 300 and/or the tasks would not need to experience downtime to update the tasks.

Figure 7:
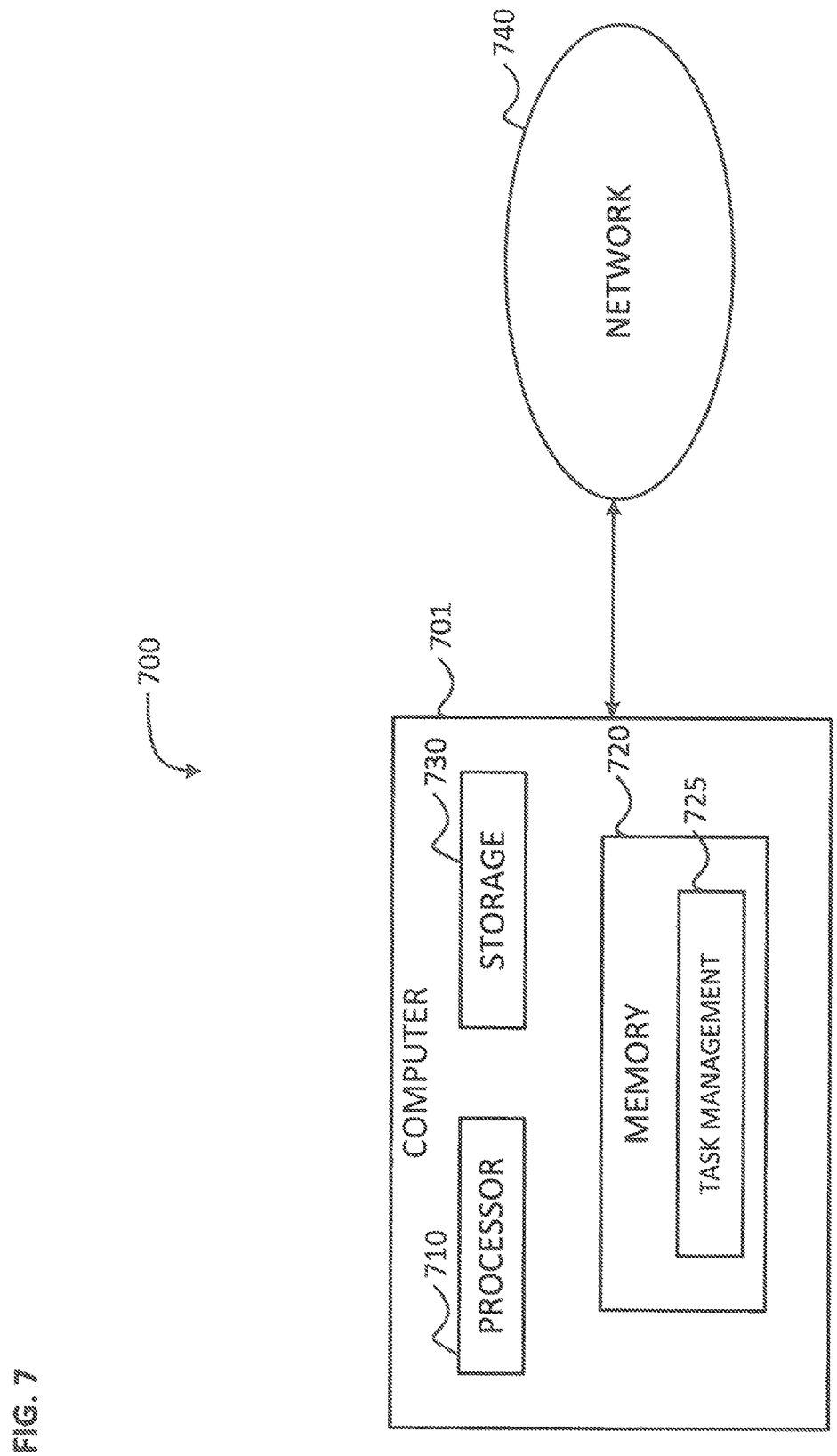
FIG. 7 is a diagram illustrating an example of a hardware system for managing or using tasks, consistent with certain disclosed embodiments.

FIG. 7 is a diagram illustrating an example of a hardware system for managing or using tasks, consistent with certain disclosed embodiments. The example system 700 includes example system components that may be used. The components and arrangement, however, may be varied.

A computer 701 may include a processor 710, a memory 720, storage 730, and input/output (I/O) devices (not pictured). The computer 701 may be implemented in various ways and can be configured to perform any of the embodiments described above. For example, the computer 701 may be a general purpose computer, a mainframe computer, a specialized computer for performing mission critical functions, a specialized computer for maintaining task definitions, any combination of these components, or any other appropriate computing device. The computer 701 may be standalone, or may be part of a subsystem, which may, in turn, be part of a larger system.

In some embodiments, the computer 701 can implement, for example, server 110 or agents 120-140 as shown in FIG. 1.

The processor 710 may include one or more processing devices, such as, for example, a microprocessor from the Intel Core™ family manufactured by Intel™, the Phenom™ family manufactured by AMD™, or the like. Memory 720 may include one or more non-transitory storage devices configured to store information and/or instructions used by processor 710 to perform certain functions and operations related to the disclosed embodiments, such as the method of FIG. 2. Storage 730 may include a volatile, non-volatile, non-transitory, magnetic, semiconductor, tape, optical, removable, non-removable, or other type of computer-readable medium used as a storage device. In some embodiments, storage 730 can store task definitions, task locations, agent programs, classes, libraries, etc.

In one embodiment, memory 720 may include one or more programs or subprograms including instructions that may be loaded from storage 730 or elsewhere that, when executed by computer 701, perform various procedures, operations, or processes consistent with disclosed embodiments. For example, memory 720 may include a task management program 725 for managing task definitions and task locations or retrieving, executing, and maintaining tasks, according to various disclosed embodiments. Memory 720 may also include other programs that perform other functions, operations, and processes, such as programs that provide communication support, Internet access, etc. The task management program 725 may be embodied as a single program, or alternatively, may include multiple sub-programs that, when executed, operate together to perform the functions and operations of the task management program 525 according to disclosed embodiments. In some embodiments, task management program can perform the process and operations of FIG. 2 described above.

The computer 701 may communicate over a link with a network 740. For example, the link may be a direct communication link, a local area network (LAN), a wide area network (WAN), or other suitable connection. The network 740 may include the Internet, as well as other networks, which may be connected to various systems and devices.

The computer 701 may include one or more input/output (I/O) devices (not pictured) that allow data to be received and/or transmitted by the computer 701. I/O devices may also include one or more digital and/or analog communication I/O devices that allow the computer 701 to communicate with other machines and devices. I/O devices may also include input devices such as a keyboard or a mouse, and may include output devices such as a display or a printer.

The computer 701 may receive data from external machines and devices and output data to external machines and devices via I/O devices. The configuration and number of input and/or output devices incorporated in I/O devices may vary as appropriate for various embodiments.

Example uses of the system 700 can be described by way of example with reference to the example embodiments described above.

While the teachings has been described with reference to the example embodiments, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A computer-implemented method, comprising:
   receiving task data;
   determining a task definition based on the task data, wherein determining the task definition includes determining a compatible version of the task definition;
   determining a location of the task definition
   retrieving the task definition from the determined location;
   executing, using a processor and at a client device, the task definition; and
   while executing the task definition:
      determining a class or a library to be used during execution of the task definition based on a type specification identifying a type of the client device executing the task definition;
      retrieving the class or the library that was determined; and
      retrieving an input used to perform instructions of the task definition.

2. The computer-implemented method of claim 1, wherein the type of the client device comprises one or more of a personal computer, a mobile device, a tablet computer, or a specialized device that is part of a mission critical environment.

3. The computer-implemented method of claim 1, wherein the location of the task definition comprises a location of a database in a distributed network of servers.

4. The computer-implemented method of claim 1, wherein the client device runs a virtual machine, and the virtual machine runs an agent program that executes the task definition, the method further comprising:
   creating a sandbox for running the agent program, wherein operations performed by the agent program are controlled using the sandbox.

5. The computer-implemented method of claim 1, further comprising, while executing the task definition, executing instructions in the task definition to adapt a function of the task definition.

6. The computer-implemented method of claim 5, wherein:
retrieving the class or the library that was determined comprises retrieving the class; and
executing instructions in the task definition to adapt a function of the task definition comprises executing instructions in the task definition to adapt a function provided by the class that was retrieved.

7. The computer-implemented method of claim 1, further comprising, prior to executing the task definition:
instantiating a classloader;
retrieving, using the classloader, the task definition from a non-volatile memory;
loading, using the classloader, the task definition into a cache memory or a volatile memory; and
verifying that the task definition was loaded correctly using a checksum.

8. A system comprising:
a processing system of a device comprising a processor; and
a memory system comprising a computer-readable medium, wherein the computer-readable medium contains instructions that, when executed by the processing system, cause the processing system to perform operations comprising:
receiving task data;
determining a task definition based on the task data, wherein determining the task definition includes determining a compatible version of the task definition;
determining a location of the task definition;
retrieving the task definition from the determined location;
executing, at a client device, the task definition; and
while executing the task definition:
determining a class or a library to be used during execution of the task definition based on a type specification identifying a type of the client device executing the task definition;
retrieving the class or the library that was determined; and
retrieving an input used to perform instructions of the task definition.

9. The system of claim 8, wherein the type of the client device comprises one or more of a personal computer, a mobile device, a tablet computer, or a specialized device that is part of a mission critical environment.

10. The system of claim 8, wherein the location of the task definition comprises a location of a database in a distributed network of servers.

11. The system of claim 8, wherein the client device runs a virtual machine, and the virtual machine runs an agent program that executes the task definition, the operations further comprising:
creating a sandbox for running the agent program, wherein operations performed by the agent program are controlled using the sandbox.

12. The system of claim 8, the operations further comprising, while executing the task definition, executing instructions in the task definition to adapt a function of the task definition.

13. The system of claim 12, wherein:
retrieving the class or the library that was determined comprises retrieving the class; and
executing instructions in the task definition to adapt a function of the task definition comprises executing instructions in the task definition to adapt a function provided by the class that was retrieved.

14. The system of claim 8, the operations further comprising, prior to executing the task definition:
instantiating a classloader;
retrieving, using the classloader, the task definition from a non-volatile memory;
loading, using the classloader, the task definition into a cache memory or a volatile memory; and
verifying that the task definition was loaded correctly using a checksum.

15. A non-transitory computer-readable storage medium comprising instructions for causing a processor to perform operations comprising:
receiving task data;
determining a task definition based on the task data, wherein determining the task definition includes determining a compatible version of the task definition;
determining a location of the task definition
retrieving the task definition from the determined location;
executing, using a processor and at a client device, the task definition; and
while executing the task definition:
determining a class or a library to be used during execution of the task definition based on a type specification identifying a type of the client device executing the task definition;
retrieving the class or the library that was determined; and
retrieving an input used to perform instructions of the task definition.

16. The non-transitory computer-readable storage medium of claim 15, wherein the type of the client device comprises one or more of a personal computer, a mobile device, a tablet computer, or a specialized device that is part of a mission critical environment.

17. The non-transitory computer-readable storage medium of claim 15, wherein the location of the task definition comprises a location of database in a distributed network of servers.

18. The non-transitory computer-readable storage medium of claim 15, wherein the client device runs a virtual machine, and the virtual machine runs an agent program that executes the task definition, the operations further comprising:
creating a sandbox for running the agent program, wherein operations performed by the agent program are controlled using the sandbox.

19. The non-transitory computer-readable storage medium of claim 15, the operations further comprising, while executing the task definition, executing instructions in the task definition to adapt a function of the task definition.

20. The non-transitory computer-readable storage medium of claim 19, wherein:
retrieving the class or the library that was determined comprises retrieving the class; and
executing instructions in the task definition to adapt a function of the task definition comprises executing instructions in the task definition to adapt a function provided by the class that was retrieved.

* * * * *